United States Patent [19]
Smith et al.

[11] Patent Number: 5,969,267
[45] Date of Patent: Oct. 19, 1999

[54] FLOWMETER HAVING A TEMPER PROOF HOUSING MOUNTED ON A PIPE SECTION THEREOF FOR A TELEMETERING UNIT INCLUDING A BATTERY AND A CIRCUIT

[75] Inventors: Wade W. Smith, Branchburg, N.J.; John L. Wickham, Glen Arm, Md.; David A. Saar, Titusville, N.J.

[73] Assignee: Emhart Glass S.A., Cham, Switzerland

[21] Appl. No.: 08/972,848

[22] Filed: Nov. 18, 1997

[51] Int. Cl.⁶ .............................. G01F 15/00; G01F 15/14
[52] U.S. Cl. ...................... 73/861.77; 73/273; 340/615
[58] Field of Search ............... 73/861.77, 861.78, 73/861.79, 861.83, 272 R, 273 OR, 275; 340/615, 610

[56] References Cited

U.S. PATENT DOCUMENTS 5,747,701  5/1998  Marsh et al. ...................... 73/861.23

*Primary Examiner*—Harshad Patel
*Attorney, Agent, or Firm*—Spencer T. Smith

[57] ABSTRACT

A system for monitoring the flow of water through a pipe. A pipe section is adapted to be located in a water line which includes a metering device having a target displaceable at a rate representative of the rate of flow through the pipe section. A telemetering unit includes a sensor for sensing a target and a receiver for receiving the output of the sensor and transmitting data representative of the flow to a remote receiver. A housing houses the telemetering unit and is releasably secured to the pipe section so that the sensor will sense the metering device target.

6 Claims, 4 Drawing Sheets

5,969,267

FLOWMETER HAVING A TEMPER PROOF HOUSING MOUNTED ON A PIPE SECTION THEREOF FOR A TELEMETERING UNIT INCLUDING A BATTERY AND A CIRCUIT

BACKGROUND OF THE INVENTION

The present invention relates to a system for monitoring the flow of water through a pipe and more particularly to a battery operated flowmeter which can transmit flow related data (volume and/or temperature) to a remote receiver.

It is becoming more and more important to conserve our resources. While it has long been appreciated that monitoring and billing for resource use will cause a decrease in the use of the monitored resource, many situations, such as water use by a tenant in an apartment complex, do not lend themselves to monitoring.

To monitor such very local water use, a number of monitors is often required and accordingly for such monitors to be economically viable they have to be very inexpensive to install and have a low cost. Such a monitor must be battery powered and since batteries will only power a system for a definite period of time, the batteries will have to be periodically replaced.

OBJECT OF THE INVENTION

It is accordingly an object of the present invention to provide a battery powered flowmeter which can be produced at low cost and which can be easily installed but which will be tamper resistant when installed.

It is another object to provide a battery powered flow measuring system which is designed so that the batteries can be quickly changed.

In the present invention, a water supply line is disconnected to insert a flow sensing device which can produce a repetitive signal representative of the flow through the pipe. An annular telemetering device is releasably located around the flow sensing device. The flow sensing device can only be removed from its location around the flow sensing device with a special tool. Should the batteries or electronics fail, the annular telemetering device will be removed and replaced by another annular telemetering device. Should the flow sensing device fail, only a licensed meter technician or a plumber who possess the special tool can remove the flow sensing device from the water line once the annular telemetering device is removed from its location around the flow sensing device, and replace it with another flow sensing device.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE PREFERRED EMBODIMENT

Figure 1:
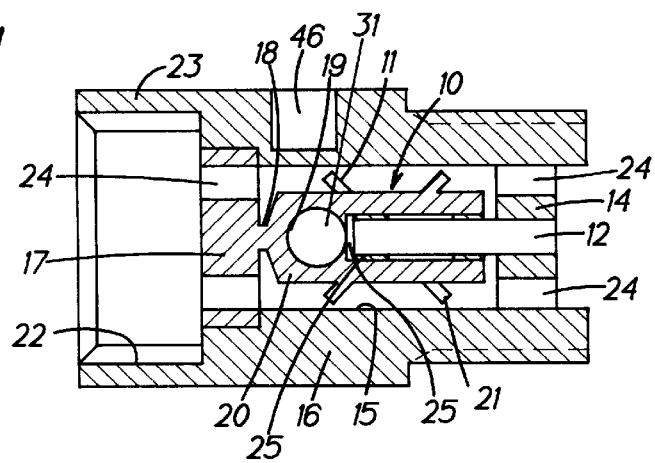
FIG. 1 is an elevational cross sectional view of a flow indicating device.

The metering device may be an axial turbine 10 (FIG. 1) which has vanes 11. The axial turbine which rotates as fluid flows through the pipe section is supported by a sapphire hardness glass plate 25 mounted in the axial turbine which rides against a metallic shaft 12 axially supported by a disc 14 permanently located within the flow passage. 15 of a pipe section 16. A second disc 17, which also is permanently located within the flow passage 15 of the pipe section 16, has an axially projecting pin 18 which is received within a recess 19 in the end of the axial turbine remote from the shaft. The pipe. section has male 21 and female 22 threaded ends (the female end includes a head 23 which can be engaged by a wrench or the like) The discs 14,17 have a number of axial holes 24 to direct water flow past the axial turbine. The pipe section can be located in a water line by a plumber who will disconnect the water supply line, add male and female ends and connect them to the threaded ends of the pipe section 16 (alternately the ends of the pipe section could be unthreaded and connected to the disconnected water supply line with adhesive, compression fittings or the like).

Figure 2:
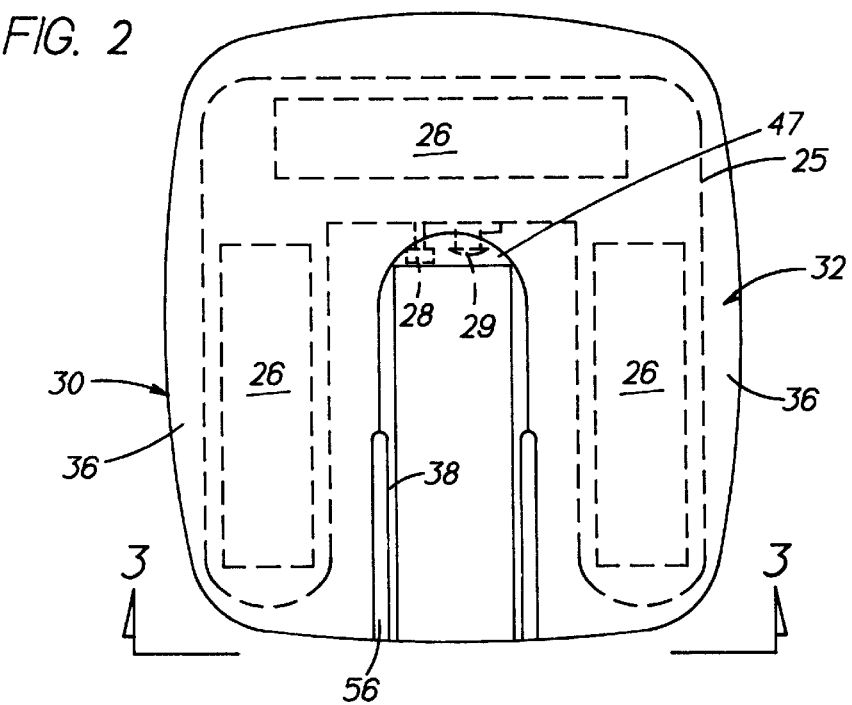
FIG. 2 is a top view of a two part housing for the telemetering system (the batteries and electronics which will gather data about the flow indicating device and transmit the data to a remote receiver)
Figure 3:
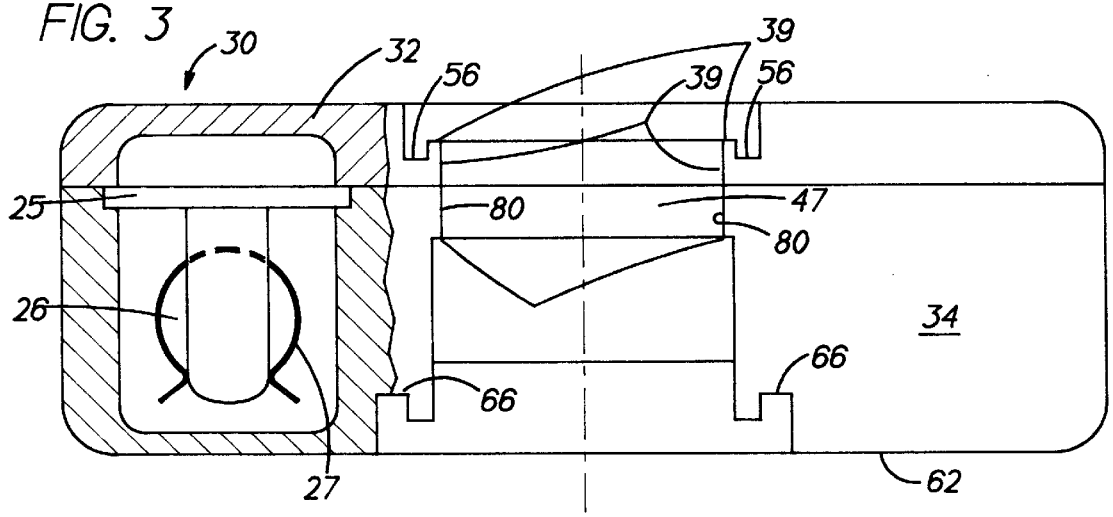
FIG. 3 is a view of the two part housing taken along the lines 3—3 of FIG. 2.
Figure 4:
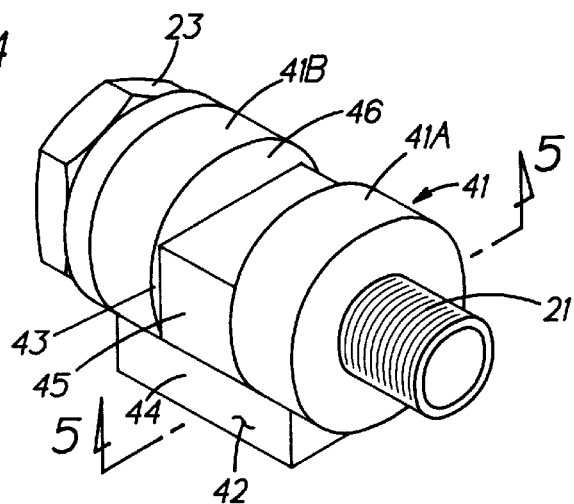
FIG. 4 is a perspective view of the flow indicating device.

A plastic telemetering housing 30 (FIGS. 2 and 3) is "U" shaped and has an upper portion 32 and a lower portion 34 connected together via connection pins 35 (FIG. 9) to form a water tight "U" shaped compartment. The side walls of the opening between the legs 36 of the housing, which define a slot, define opposed horizontally extending top guide surfaces 38 and opposed vertically extending side guide surfaces 39 in the upper housing portion and opposed horizontally extending bottom guide surfaces 40 in the lower housing portion. The body of the pipe section (FIG. 4) has a cylindrical portion 41 which is supported by a rectangular base 42. Parallel slots 43, are defined in the cylindrical portion 41, for engaging the guide surfaces 38, 39, 40 of the housing, so that the pipe section can be slid into the center of the housing (the width of the rectangular base is selected so that the side walls 44 will continue the base 45 of the parallel slots 45). A channel 46 is defined in the cylindrical portion which is perpendicular to the parallel slots 43 for receiving a matched, hollow shelf portion 47 formed between the upper and lower housing portions. The parallel slots 43 and the transverse channel 46 accordingly separate the cylindrical portion into male end 41A and female end 41B portions. When the pipe section is fully inserted into the slot, relative rotation or axial displacement between the pipe section and the housing will be prevented.

The water proof compartment of the "U" shaped housing houses the electronics which take the form of a circuit board 25 and batteries 26 which power the electronics and which are supported by spring clips 27 or solder pins carried by the printed circuit board. The hollow shelf portion 47 will receive a thermistor 28 for sensing the temperature of the water passing through the pipe and a Hall cell 29 for sensing the revolutions of the axial turbine by sensing the rotating cylindrical ceramic target 31 (the cylinder has a length selected so that the ends will be proximate the Hall cell when the target rotates past so that the Hall sensor can read the rotational speed of the axial turbine. These elements provide the electronics with suitable signals and the electronics transmits data to a remote receiver so that BTU consumption and/or water use can be computed.

Figure 5:
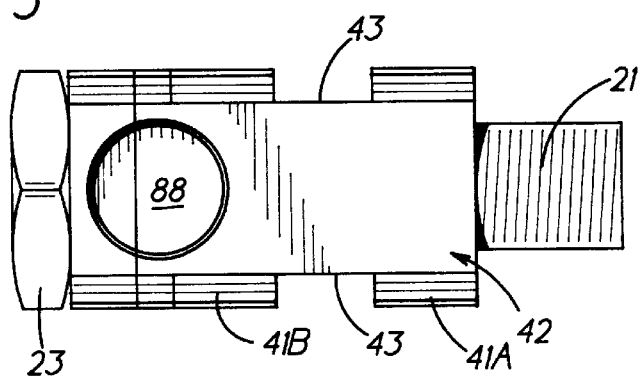
FIG. 5 is a view of the flow indicating device taken at 5—5 of FIG. 4.
Figure 6:
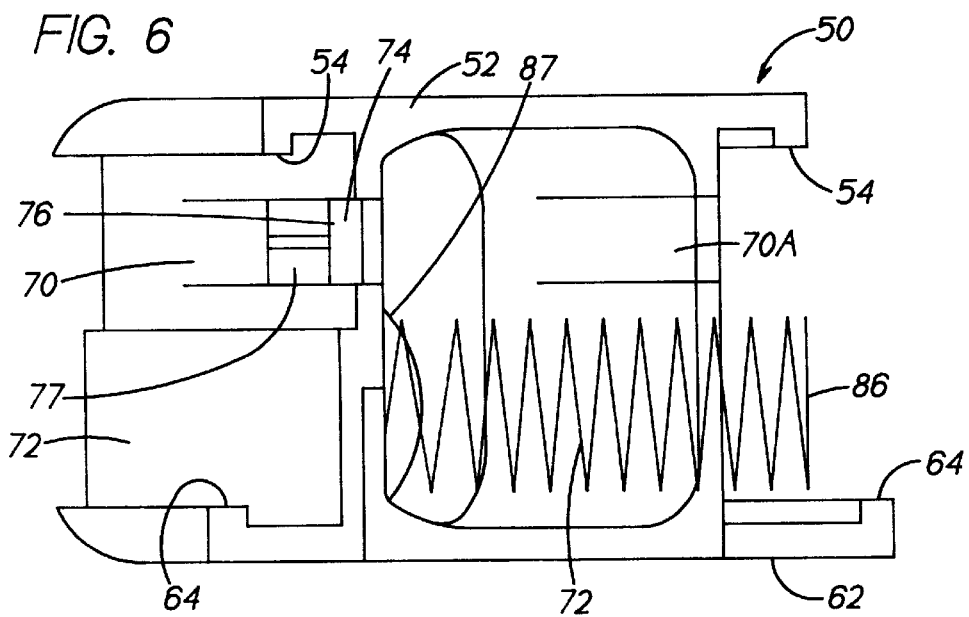
FIG. 6 is an oblique view of the end cap for the two part housing.
Figure 7:
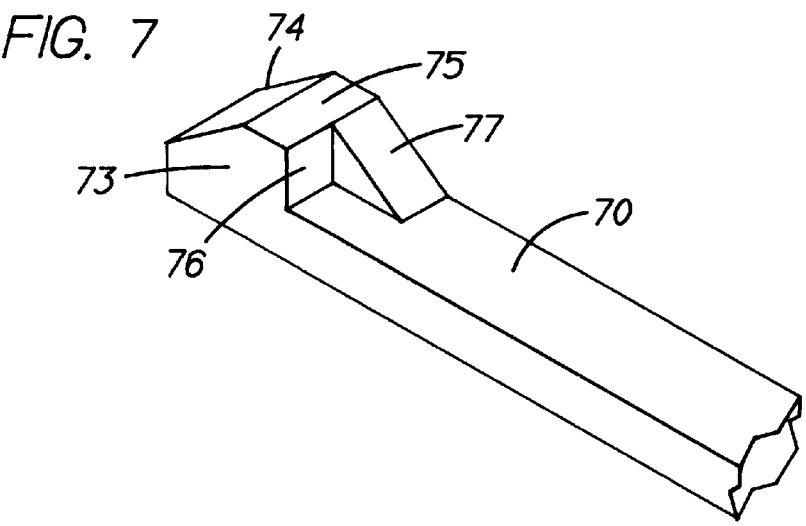
FIG. 7 is an oblique view of a portion of a spring finger of the end cap.
Figure 8:
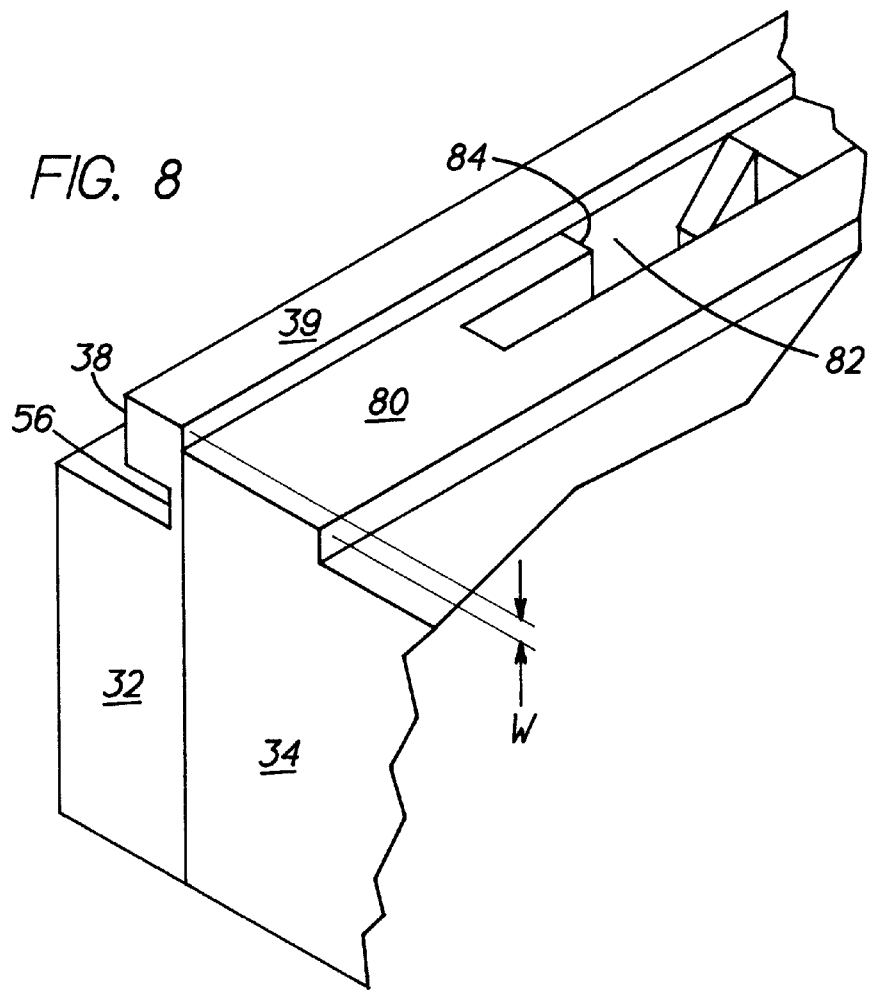
FIG. 8 is an oblique view of a portion of the slot of the two part housing.

To close the telemetering housing slot, an end plug 50 is slid into the end of the housing slot once the pipe section has been fully inserted into the housing slot (the two housing sections wrap around the pipe section when engaged). The upper wall 52 of the end cap has depending linear keys 54 which will be received by keyways 56 defined along the top edges of the upper housing slot. The lower wall 62 of the end cap has upwardly projecting linear keys 64 which will be received by keyways 66 defined along the bottom edges of the upper housing slot. A horizontally extendable deflectable finger 70, 70A is defined in either side wall 72 of the end cap. These deflectable fingers are integral with the side walls remote from the pipe section. Each deflectable finger has an outwardly projecting head 73 which has a lead in surface 74 (FIG. 7 which shows finger 70) which merges with a horizontal flat portion 75. Approximately half of the flat surface 75 terminates with a right angled surface 76. The remaining portion of the flat surface merges with an inwardly sloping ramp 77. As the end cap is slid onto the housing, the lead in surfaces 74 engage opposed parallel surfaces 80 (FIGS. 3 and 8) on the lower housing 34 and the fingers are deflected inwardly. A slot 82 is defined in each of these parallel surfaces 80 for receiving the head portion of the finger. When the slightly less than right angled surface 76 of the head portion of the finger is pushed beyond the stop surface 84 of the slot 82, the head portion springs into the slot where the right angled surface 76 will engage the stop surface 84 preventing removal of the end cap. A compression spring 86 which extends between a pocket 87 in the end cap and a pocket 88 in the pipe section (FIG. 5), maintains these surfaces in engagement. The top and bottom surfaces of the upper and lower housings and the end cap can be defined to closely conform to the nut and threaded portion.

Figure 9:
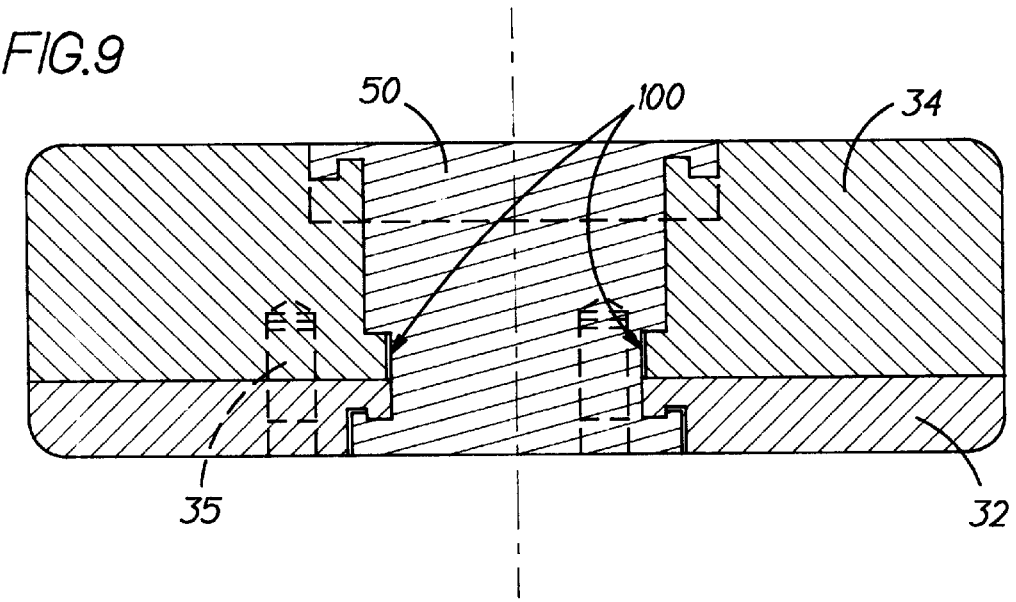
FIG. 9 is an end view of the two part housing closed with the end cap.
Figure 10:
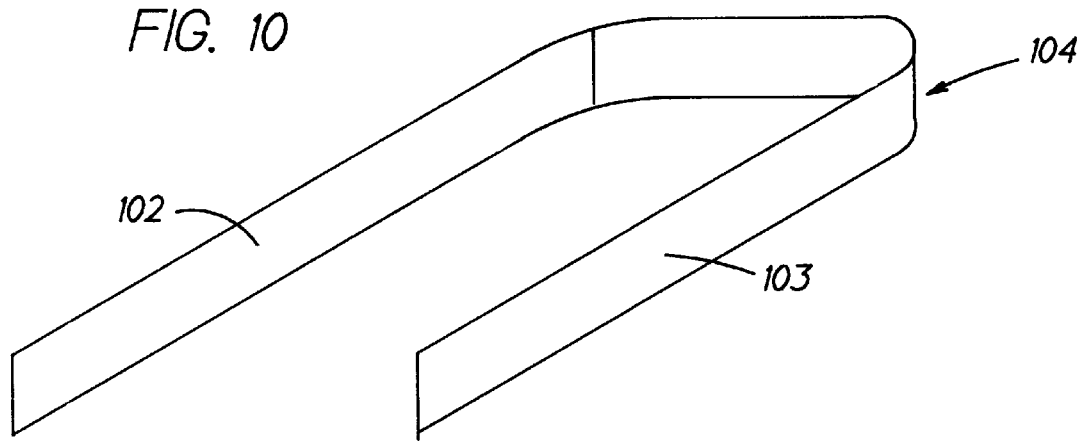
FIG. 10 is an oblique view of a release tool.

As can be seen from FIG. 9, when the end cap is secured in place, a pair of release slots 100 are defined between side surface 80 of the lower housing and the fingers 70, 70A. The interconnected housing portions which wrap around the pipe section are accordingly tamper resistant and release requires a special tool 104 which has a pair of steel blades. To release the end cap, a pair of spring steel blades 102 of a release tool 104 are inserted into these release slots 100 which are sized to match the size of the blades. Since the blades fill the release slots, when the blades reach the projecting head 73 of the fingers, the blades will engage the ramp 77 and deflect the head out of the slot whereupon the spring will release the end cap.

We claim:

1. A system for monitoring the flow of water through a pipe comprising a pipe section adapted to be located in a water supply line including a metering device for presenting readable information representative of the rate of flow through the pipe section, a telemetering unit including circuit means for reading the readable information presented by said metering device, converting the read information into data representative of the flow through the pipe section and transmitting the data to a remote receiver, battery means for powering said circuit means, and first housing means having a hermetically sealed compartment for housing said telemetering unit, means for interconnecting said housing means and said pipe section including key means on said housing means and keyway, means on said pipe section selectively oriented to prevent relative axial and rotational displacement between the interconnected housing means and said pipe section, and second housing means, locking means for releasably locking said second housing means on said first housing means to prevent relative movement between said first housing means key means and said pipe section keyway means when said first housing means and said pipe section are interconnected to maintain said first housing means interconnected with said pipe section.

2. A system for monitoring the flow of water through a pipe according to claim 1, wherein said first housing means is "U" shaped defining a slot having opposed sides for receiving said pipe section, and said first housing means key means includes a pair of opposed keys extending along the opposed sides of said slot.

3. A system for monitoring the flow of water through a pipe according to claim 2, wherein said second housing means includes an end cap having opposed sides each including a keyway for receiving said opposed keys of said housing means.

4. A system for monitoring the flow of water through a pipe according to claim 3, wherein each of said end cap sides includes a pair of fingers, each having a head projecting towards said opposed housing means keys and deflected by said keys, said opposed keys each including a recess for receiving a head of one of said fingers when said end cap is fully inserted into said slot, and each of said recesses and a head received therein comprising said locking means for preventing the withdrawal of said end cap.

5. A system for monitoring the flow of water through a pipe according to claim 4, wherein said end cap has top, bottom, and end surfaces selectively configured to mate with the adjacent first housing means and a pair of blade sized slots in the end surface selectively located to receive a pair of blades of a special tool for insertion through said slots along said keys, each of said heads having a ramp surface located to engage with an inserted blade to deflect the fingers out of said recesses.

6. A system for monitoring the flow of water through a pipe according to claim 5, further comprising spring means compressively located between said end cap end surface and said pipe section for facilitating removal of said end cap when said fingers are deflected out of said recesses.

* * * * *